United States Patent Office.

WILLIAM HENRY BALMAIN, OF ST. HELENS, GREAT BRITAIN.

Letters Patent No. 102,205, dated April 26, 1870.

IMPROVEMENT IN CONCENTRATING OIL OF VITRIOL.

The Schedule referred to in these Letters Patent and making part of the same.

I, WILLIAM HENRY BALMAIN, of St. Helens, in the county of Lancaster, Kingdom of Great Britain and Ireland, have invented an Improvement in Concentrating Vitriol, of which the following is a specification.

Nature and Objects of the Invention.

My invention relates to the concentration of vitriol, (sulphuric acid,) and consists in causing the strong and pure vitriol while being concentrated in an iron vessel to be the means of partly concentrating and purifying weaker or more impure vitriol which is poured into and permitted to overflow from a leaden vessel suspended or supported within the said iron vessel, as explained hereafter.

The object of my invention is to concentrate vitriol in more economical vessels than have heretofore been used for the purpose.

General Description.

In using leaden vessels for concentrating vitriol, the melting point of lead is so low that the vessels are frequently destroyed even in concentrating up to a strength of 150° Twaddell, and in concentrating above this strength it has been hitherto deemed necessary to employ expensive platinum vessels.

It has been discovered that vitriol may be concentrated in more economical vessels of cast or wrought-iron if the vitriol is strong and pure; if, for instance, it be up to the strength of 130° Twaddell, it may be concentrated in any ordinary iron boiler.

In thus concentrating pure and strong vitriol in iron vessels, I can at the same time so prepare the more impure and weaker vitriol that it shall not have a corrosive effect on the iron. In about the central of the iron vessel I suspend or support a smaller vessel of lead, into which the weaker or more impure vitriol is permitted to run slowly and continuously and to overflow therefrom into the outer vessel.

To boil the strong vitriol in the outer vessel demands a higher temperature, and consequently imparts sufficient heat to the leaden vessel to boil the impure vitriol and remove therefrom the volatile impurities, and also partly concentrate it before it overflows into the outer vessel, and is brought in contact with the iron. While the iron vessel is thus protected from the corrosive action of impure vitriol the leaden vessel is protected from excessive heat, and is not subjected to undue pressure.

When the use of the iron vessel has to be discontinued, it should be emptied and thoroughly cleansed, or otherwise protected from the air, which, by diluting on the surface any vitriol remaining in the vessel, might reduce the same to such a condition as to have a severe corrosive effect on the metal.

Claims.

1. The concentrating of strong or pure vitriol in an iron vessel, within which is suspended or supported a vessel of lead for receiving weaker and impurer vitriol.

2. The arrangement within the outer iron vessel of a leaden receptacle, so that the contents of the latter may boil over and into the outer vessel as specified.

In testimony whereof I have signed my name to this specification in the presence of two subscribing witnesses.

WILLIAM HENRY BALMAIN.

Witnesses:
P. WILLIAMSON DONNVILLE,
SAM. BRIGHOUSE.